United States Patent [19]

Klapper et al.

[11] Patent Number: 5,312,848

[45] Date of Patent: May 17, 1994

[54] THERMOFORMABLE POLYISOCYANURATE FOAM LAMINATES FOR INTERIOR FINISHING APPLICATIONS

[75] Inventors: Kenneth P. Klapper, Hillsborough County; Wayne E. Laughlin; John P. Oliver, both of Pinellas County, all of Fla.

[73] Assignee: The Celotex Corporation, Tampa, Fla.

[21] Appl. No.: 935,799

[22] Filed: Aug. 27, 1992

Related U.S. Application Data

[63] Continuation-in-part of Ser. No. 879,616, May 12, 1992, abandoned, which is a continuation-in-part of Ser. No. 716,565, Jun. 17, 1991, abandoned.

[51] Int. Cl.$^5$ .............................................. C08G 18/00
[52] U.S. Cl. ................................ 521/172; 264/46.4; 264/46.8; 521/902
[58] Field of Search ............... 521/172, 902; 264/46.8, 264/46.4

[56] References Cited

U.S. PATENT DOCUMENTS

| | | | |
|---|---|---|---|
| 3,600,340 | 8/1971 | Patton et al. | 260/2.5 |
| 4,025,687 | 5/1977 | Wooler et al. | 428/310 |
| 4,073,840 | 2/1978 | Saidla | 264/45.3 |
| 4,129,697 | 12/1978 | Schapel et al. | 521/176 |
| 4,172,869 | 10/1979 | Oishi et al. | 264/46.3 |
| 4,204,019 | 5/1980 | Parker | 428/310 |
| 4,362,678 | 12/1982 | Skowronski et al. | 264/46.3 |
| 4,411,949 | 10/1983 | Snider et al. | 428/304.4 |
| 4,508,774 | 4/1985 | Grabhoefer et al. | 428/220 |
| 4,555,442 | 11/1985 | Frentzel | 428/318.4 |
| 4,600,621 | 7/1986 | Maurer et al. | 428/121 |
| 4,603,078 | 7/1986 | Zanker et al. | 428/317.9 |
| 4,680,214 | 7/1987 | Frisch et al. | 428/107 |
| 4,727,095 | 2/1988 | Konig et al. | 521/166 |
| 4,741,945 | 5/1988 | Brant et al. | 428/158 |
| 4,791,019 | 12/1988 | Ohta et al. | 428/304.4 |
| 4,812,368 | 3/1989 | Scherzer et al. | 428/332 |
| 4,851,283 | 7/1989 | Holtrop et al. | 428/284 |
| 4,863,791 | 9/1989 | Steward et al. | 428/310.5 |
| 4,871,612 | 10/1989 | Okina et al. | 428/269 |
| 4,938,819 | 7/1990 | Ishii et al. | 156/78 |

OTHER PUBLICATIONS

Frank, W., "Thermoformable Polyurethane Foam for the Manufacturing of Headliners and Other Automotive Interior Trim Parts", Polyurethane World Congress 1987–Sep. 29–Oct. 2, 1987, pp. 678–685.

*Primary Examiner*—Morton Foelak
*Attorney, Agent, or Firm*—Charles W. Vanecek

[57] ABSTRACT

Thermoformable polyisocyanurate foams are prepared by reacting together under foam-forming conditions an organic polyisocyanate and an isocyanate-reactive compound, especially an aromatic polyester polyol, the equivalent ratio of isocyanate groups to isocyanate reactive groups being at least about 1.2:1. The foams and faced composites thereof can be thermoformed for a wide range of uses, such as in the interior of motor vehicles, aircraft, ships and other transport means, and of both residential and commercial buildings.

29 Claims, 2 Drawing Sheets

THERMOFORMABLE POLYISOCYANURATE FOAM LAMINATES FOR INTERIOR FINISHING APPLICATIONS

This is a continuation-in-part of application Ser. No. 07/879,616, filed May 12, 1992, now abandoned, which is a continuation-in-part of application Ser. No. 07/716,565, filed Jun. 17, 1991, now abandoned.

BACKGROUND OF THE INVENTION

1. Field of the Invention

This invention relates to thermoformable polymeric foams and their use in shaped composites. More particularly, the invention is directed to the formation of shaped polyisocyanurate foam parts, especially panels, which have a wide range of uses, such as in the interior of motor vehicles, aircraft, ships and other transport means, and of both residential and commercial buildings.

2. Description of the Prior Art

The preparation of cellular polymeric molded parts, such as those involving polyurethane and polyisocyanurate foams, is well known. The resulting shapes may be advantageously used in a broad range of applications, e.g., as interior finishing materials in the railway, automotive, and aircraft industry, and in the building industry.

Both the polyurethanes and polyisocyanurates can be made by reacting a polyhydroxy-compound with a polyisocyanate, with a greater proportion of the polyisocyanate being used in the manufacture of the polyisocyanurates to make the latter highly cross-linked and therefore characterized by high compressive strength and a much greater heat and flame resistance than the polyurethanes. Unfortunately, the wide field of application potentially available to the polyisocyanurate foams by virtue of these improved properties is severely offset by their brittleness, which has impeded their being thermoformed into useful molded parts.

While there have been attempts to reduce the brittleness of polyisocyanurate foams and make them the foams of choice in thermoforming processes (see, e.g., U.S. Pat. No. 4,129,697), they are still regarded as unsatisfactory for practical use. For example, the polyisocyanurate foams of U.S. Pat. No. 4,129,697, which are synthesized predominantly from distilled diphenylmethane-4,4'-diisocyanate, are economically disadvantageous because of their high content of this relatively expensive isocyanate component. Accordingly, there is still a need for an economical polyisocyanurate foam whose properties qualify it for use in interior molded parts and which can be formed into such parts in an efficient and inexpensive manner.

OBJECTS OF THE INVENTION

It is therefore an object of the present invention to provide a polymeric foam material which has a combination of properties desirable for interior finishing applications and can be produced efficiently and inexpensively.

It is another object of the present invention to provide a lightweight thermoformable polyisocyanurate foam or foam laminate having a combination of advantageous properties for interior finishing applications, including high thermal stability, compressive and flexural strengths, formability, dimensional stability, insulation properties, sound absorption, flexibility and moisture resistance.

These and other objects and advantages of the present invention will become more apparent to those skilled in the art when the instant disclosure is read in conjunction with the accompanying drawings wherein.

DESCRIPTION OF THE INVENTION

Figure 1:
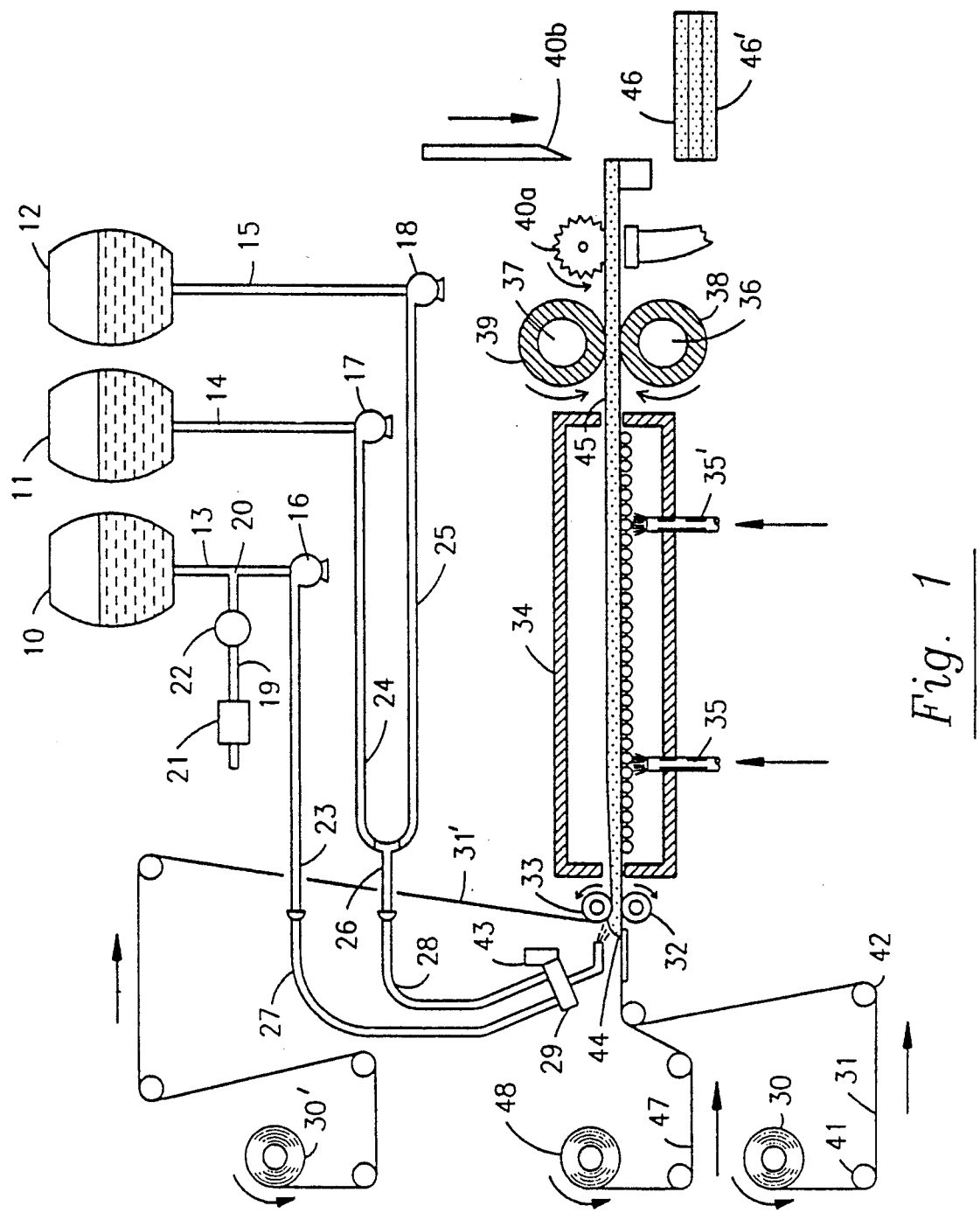
FIG. 1 is a side schematic representation of an apparatus suitable for producing a foam laminate in accordance with the present invention.

The above objects have been achieved through the production of an open or closed cell thermoformable polyisocyanurate foam having an impervious or permeable facing adhered to at least one side thereof. The polyisocyanurate foams of the invention are both dimensionally stable to heat and capable of being thermoformed. They can be made in a continuous process by reacting a polyisocyanate with a polyhydroxy compound, preferably a polyester polyol, in the presence of a blowing agent. The polyhydroxy component may be a polyester-polyether polyol mixture, such mixture appropriately comprising at least 55 percent by weight of polyester polyol. The foaming reaction may be carried out in the presence of catalysts, auxiliaries and additives.

After production of the polyisocyanurate foam, it is thermoformed into the molded product of the invention. One or more facing materials may be applied during the foaming and/or thermoforming steps. Adhesives may advantageously be used to bond the facers to the foam. In a preferred embodiment, the polyisocyanurate foam to be thermoformed has at least 50%, more preferably at least 70% open cells.

The thermoformable polyisocyanurate foams of the invention are advantageously produced in the form of rigid foam laminates or panels, which are relatively thin (e.g., 5–25 mm thick board), by the reaction of the polyisocyanate component with an isocyanate-reactive component on a continuous laminator. One or both sides of the board or sheet are suitably covered with a layer(s) of thermoformable material which becomes attached by the foaming process. The relative proportions of reactive components are generally such that the equivalent ratio of isocyanate groups in the polyisocyanate component to all isocyanate reactive groups present in the foam-forming mixture (e.g., hydroxy groups of the polyol component) is at least about 1.2:1, preferably at least about 1.5:1.

The thermoforming process may be carried out continuously or discontinuously. For example, the thermoformed product may be produced continuously by heating a foam sheet in a heating zone and then passing it between molding media such as rollers which may be heated and/or profiled, or discontinuously by the known technique of molding with conventional dies.

A wide variety of polyisocyanates may be employed in accordance with the invention, including the preferred difunctional components of U.S. Pat. No. 4,129,697, such as 4,4'-diphenylmethane diisocyanate or its isomers. In a preferred embodiment of the invention, the polyisocyanate is a polymeric MDI or contains sufficient polymeric MDI so that the resultant foams possess the desired mechanical properties, e.g., good compressive and flexural strengths, dimensional stability, flexibility, etc. For example, one preferred mixture of polymeric MDI and diphenylmethane diisocyanate contains less than 40 weight percent of the latter component.

Suitable polyisocyanates include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-,1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2'-biphenyl diisocyanates, 2,2'-, 2,4'- and 4,4'- diphenylmethane diisocyanates, polymethylenepolyphenylene polyisocyanates (polymeric MDI), and aromatic aliphatic isocyanates such as 1,2-, 1,3-, and 1,4-xylylene diisocyanates.

Organic isocyanates containing heteroatoms may also be utilized, for example, those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are polymethylenepolyphenylenepolyisocyanates (polymeric MDI), and mixtures thereof with difunctional isocyanates such as 2,4-, and 2,6-toluene diisocyanate and mixtures thereof (TDI), and 2,4'-, 2,2'- and 4,4'-diphenylmethane diisocyanate (MDI). The polymeric MDI advantageously comprises at least 50 weight percent, preferably at least about 60 weight percent and more preferably at least about 70 weight percent of such mixtures.

Most particularly preferred are the polymeric MDI's.

Preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145.

Particularly suitable mixtures of polymeric MDI and diphenylmethane diisocyanates have a diphenylmethane diisocyanate isomer content of no more than about 50 weight percent, preferably no more than about 35 weight percent, and more preferably no more than about 25 weight percent. The polymeric MDI may be modified by incorporation of carbodiimide and/or urethane groups, or any polyisocyanate combined with the polymeric MDI may be so modified.

In preparing the polyisocyanurate foams from the organic polyisocyanates and polyhydroxyl compounds, the quantities of reactants are such that the ratio of isocyanate (NCO) groups to the total of the hydroxyl (OH) groups is from 1.2:1 to 10:1 or higher. This NCO-:OH ratio is preferably 1.6:1 to 7.0:1, more preferably 1.8:1 to 5.5:1, and most preferably 2.0:1 to 4.5:1.

Polyisocyanurates of the invention are formed by reacting the polyisocyanates with at least one polyester polyol or a mixture of at least one polyester polyol and at least one other OH-containing compound, preferably another polyhydroxyl compound(s), e.g., a polyol with a functionality greater than 2, such as a triol or tetrol, the polyester polyol preferably comprising at least about 55, more preferably at least about 80, percent by weight of such mixture. The compounds which may be used as the polyhydroxyl compound for reaction with the polyisocyanates in the preparation of the thermoformable polyisocyanurate foams of the invention include polyester and polyether polyols and chain lengthening agents which advantageously have an OH number within the range of from about 28 to 1200.

In a preferred embodiment of the invention, polyester polyols or mixtures of polyester and polyether polyols are used as the polyhydroxyl compounds. The polyether polyols advantageously comprise no more than about 45, preferably no more than about 30, and more preferably no more than about 20, weight percent of the total weight of the polyol component. Both the polyester and polyether polyols may be prepared according to known processes. For example, the polyether polyols may be prepared by the polymerization of alkylene oxides or of alkylene oxides with starting components having reactive hydrogen atoms, such as water, alcohols or amines.

The polyester polyols, which preferably are aromatic polyester polyols, can be prepared from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. The reaction typically is performed at temperatures from about 150° C. to 250° C. for a period from about 1 to 10 hours. The reaction can be carried out as a batch process or continuously. When present, excess glycol can be distilled from the reaction mixture during and/or after the reaction, such as in the preparation of low free glycol-containing polyester polyols usable in the present invention. Normally, an effective amount of catalyst is added to promote the present reaction. Any conventional esterification or transesterification catalyst (single compound or mixture of compounds) can be used. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable metal catalysts include tetraisopropyl titanate, and other such titanate salts, and the like.

After transesterification or esterification, the reaction product can be reacted with an alkylene oxide to form a polyester polyol mixture of the invention. This reaction desirably is catalyzed. The temperature of this process should be from about 80° to 170° C., and the pressure should generally range from about 1 to 40 atmospheres.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

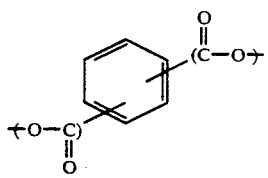

While the aromatic polyester polyols can be prepared from substantially pure reactant materials, more complex ingredients are advantageously used, such as the side-stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate ® 101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

The polyester polyols are prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. Dihydric alcohols having a molecular weight of from about 62 to 200 are especially useful. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

wherein R is a divalent radical selected from the group consisting of:
(a) alkylene radicals each containing from 2 through 6 carbon atoms, and
(b) radicals of the formula:

wherein $R^1$ is an alkylene radical containing from 2 through 6 carbon atoms, and m is an integer of from 1 through 4, and
(c) mixtures thereof.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethyl-cyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254 and 254A polyols, which are available from Cape Industries. Phthalic anhydride derived-polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company. Low functional polyester polyols such as the phthalic anhydride derived products of Stepan Company are especially useful.

The reaction between the polyisocyanate and polyester polyol components is suitably conducted in the presence of a blowing agent(s), and in the presence of catalysts, auxiliaries and additives as required (e.g., a surfactant).

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2H$, $CClFHCClF_2$, trifluorochloropropane, difluorodichloromethane, 1-fluoro-1,1-dichloroethane, 2,2,2-trifluoro-1,1-dichloroethane, 1,1-difluoro-1-chloroethane, chlorodifluoromethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

In a preferred embodiment of the invention, the foams are produced using a froth-foaming method, such as the one disclosed in U.S. Pat. No. 4,572,865, whose disclosure is hereby incorporated by reference. In this method, the frothing agent can be any material which is inert to the reactive ingredients and easily vaporized at atmospheric pressure. The frothing agent advantageously has an atmospheric boiling point of −50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred are dichlorodifluoromethane and monochlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichlorofluoromethane, 1,1,2-trichloro-1,2,2-trifluoroethane, acetone, pentane, and the like, preferably trichlorofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed. Hydrogen-containing halocarbons known as HCFCs, which are considered environmentally acceptable in that they theoretically have minimal effect on ozone depletion, may be substituted for the fully halogenated chlorofluorocarbons such as $CFCl_3$(CFC-11) and $CF_2Cl_2$(CFC-12). HCFC/water-blown foams have been found particularly desirable.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "Y-10222", "L-5420" and "L-5340, from the Dow Corning Corporation under the "DC-193" and "DC-5315", and from Goldschmidt Chemical Corporation under the tradenames "B-8408" and "B-8407". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition. The type and/or amount of surfactant advantageously may be specifically chosen to contribute to the production of open celled, rigid foams.

Any catalyst that will induce reaction of the isocyanate with the polyol and will induce isocyanurate ring formation can be employed in producing the foams of the invention. Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine or dimethyl ethanol amine as well as 1,4-diaza dicyclo-octane (2,2,2) and organo tin compounds such as dibutyltin diacetate, stannous octoate and dibutyltin dilaurate.

One preferred type of catalyst is a mixture of a tertiary amino phenol, such as 2,4,6-tris(dimethylaminomethyl)phenol (sold by Air Products and Chemicals, Inc. under the designation "TMR-30"), and an alkali metal carboxylate, such as potassium octoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g., potassium octoate), and (iii) a tertiary amine (e.g., 2,4,6-tris [dimethylaminomethyl] phenol). This mixture is described in U.S. Pat. Nos. 4,710,521, whose disclosure is hereby incorporated by reference.

The catalysts generally comprise from about 0.1 to 20, and preferably from 0.3 to 10, weight percent of the total foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, dispersing agents, reinforcing agents, plasticizers, mold release agents, stabilizers against aging and weathering, compatibility agents, fungistatic and bacteriostatic substances, dyes, fillers and pigments (e.g., carbon black), and other additives. The use of such additives is well known to those skilled in the art.

The thermoformable polyisocyanurate foams may be produced by discontinuous or continuous processes, with the foaming reaction and subsequent curing being carried out in molds or on conveyors. The process desirably yields a lightweight rigid or semi-rigid foamed material. The foamed material may be produced with or without a facing sheet or sheets and desirably contains from about 20 to 100% open cells, most preferably at least about 70% open cells (ASTM D2856). In one preferred embodiment, a foam laminate is produced and thermoformed. In an alternative preferred embodiment, the foam is produced without facers or with removable ones (e.g., paper sheets) utilized for purposes of the foaming and pre-thermoforming operations. The removable facer(s) subsequently can be taken off the foam and another facer(s) may be applied in its (their) place before, during or after the thermoforming step to form part of the finished composite article of the invention. The process for producing the laminate comprises (a) contacting at least one facing sheet with the foam-forming mixture, and (b) foaming the foam-forming mixture. The process is advantageously conducted in a continuous manner by depositing the foam-forming mixture on a facing sheet(s) being conveyed along a production line, and preferably placing another facing sheet(s) on the deposited mixture. The deposited foam-forming mixture, which suitably is in the form of a froth, is conveniently thermally cured at a temperature from about 20° C. to 150° C. in a suitable apparatus, such as an oven or heated mold.

In a highly preferred embodiment of the present invention, the polyisocyanate and polyol are reacted together to form a predominantly open celled (e.g., >50%), rigid polyisocyanurate foam using non-CFC blowing agents, e.g. HCFC's, HFC's, ethers, $H_2O$, hydrocarbons, etc. Examples of suitable low boiling HCFC's and HFC's are $CHClF_2$, $CHF_2CF_3$, $CF_3CH_2F$, $CHF_2CH_3$, $CClF_2CH_3$, and $CHClFCF_3$. When water is used as a blowing agent, surfactants developed specifically for $H_2O$ blown systems, such as Dabco 5357 and Dabco 5454 of Air Products and Chemicals, Inc., may be employed.

The endless foam or laminate thereof obtained at the end of the production line is advantageously trimmed at the edges and cut to size. A storable, thermoformable polyisocyanurate foam or foam laminate is thus obtained.

When the foam, preferably with at least one facing sheet applied thereto, is deformed by heat into the desired shape (e.g., to form inside roof linings for automobiles), it is generally heated at 150°–250° C., preferably 177° to 225° C. For example, the foam may be heated at 199°–210° C. for 1 to 6 minutes in a supporting frame until the foam softens. The heating of the faced or unfaced foam may be accomplished by various means, e.g., hot air ovens, infrared heating channels, hot plates, etc. The hot foam articles are then pressed in a mold to form the desired molded parts. The molding may be suitably accomplished at a temperature from 25° C. to 180° C., using a pressure up to 50 bar within 0.5 to 15 minutes.

A wide variety of materials can be employed as the facers in the formation of the thermoformed foam laminates. One or both sides of the thermoformed polyisocyanurate foams may be covered with reinforcements, protective surface layers and/or decorative facings. Typical facers comprise woven or non-woven sheets, foam sheets, thermoplastic sheets, metal foils, composites, etc. Application of the facers to the foam core may occur before, during and/or after the thermoforming operation in the molding tools. For example, the foam core may be initially covered with a reinforcing and/or protective layer(s) during the foaming process, and a decorative covering(s) may then be applied at the time the thermoforming occurs. The decorative covering(s) and thermoformable foam laminate can be placed in the molding apparatus and bonded together under pressure with the aid of spray, laminating, or hot-melt adhesives. Alternatively, all final coverings may be applied during or after the thermoforming step.

In a preferred embodiment, a foam laminate is continuously produced by applying the foamable chemicals to a lower carrier substrate which suitably is a fibrous layer(s), and another layer(s), which advantageously is also fibrous, is provided to cover the foam-forming mixture/lower facing layer(s) composite so as to produce a fully foamed product comprising a sandwich of plastic foam with upper and lower fibrous facers. The fibrous layer(s) can comprise organic and/or inorganic fibers. A compressive force may be applied during production to the composite to help bring about adhesion of the facer(s) to the foam core. The same or a different type of facing sheet(s), such as those described above, can be provided above and/or below the upper and lower fibrous layers.

It is common practice in the manufacture of the rigid cellular polyisocyanurates to utilize two preformulated components, commonly called the A-component and the B-component. Typically, the A-component contains the isocyanate compound that must be reacted with the polyol of the B-component to form the foam, and the remaining foam-forming ingredients are distributed in these two components or in yet another component or components.

A preferred method of manufacturing the thermoformed foam or foam laminate of the invention can be illustrated with reference to the apparatus shown in the drawings. As shown in FIG. 1, the apparatus includes tanks 10, and 12 for containing the foamable ingredients and additives such as polyisocyanate, polyol, filler, surfactant, dye, blowing agent, etc. The tanks are charged with the foam-forming mixture in whatever manner is convenient and preferred for the given mixture. For instance, the foam-forming mixture can be divided into three liquid components, with the polyisocyanate, blowing agent and surfactant in tank 10, the polyol in tank 11, and the catalyst in tank 12, each respectively connected to outlet lines 13, 14 and 15. When water is used as a co-blowing agent, it is conveniently added to tank 11 or introduced into polyol line 14. The temperatures of the ingredients are controlled to insure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. The upper and/or lower facing materials can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

Referring specifically to the production by a froth-foaming technique of a polyisocyanurate foam faced on top and bottom by fibrous layers 31' and 31, respectively, tank 10 is charged with an organic polyisocyanate admixed with a blowing agent and surfactant, tank 11 is charged with a polyol, and tank 12 is charged with a catalyst composition. The speeds of the pumps 16, 17 and 18 are adjusted to give the desired ratios of the ingredients contained in the tanks 10, 11 and 12, whereupon these ingredients pass respectively into lines 13, 14 and 15. The frothing agent is injected into line 13 upstream of high pressure metering pump 16. The ingredients pass through lines 23, 24 and 25, as well as lines 26, 27 and 28, whereupon they are mixed in the mixing head 29 and deposited therefrom through a transversely oscillating nozzle as a frothed foam mixture 44 on fibrous material 31.

Through the deposition of a partially expanded froth foam on fibrous layer 31, which desirably is a lightweight porous mat, sufficient penetration of the mat by the frothed foam mixture can be achieved to provide integral attachment of the cured foam to the mat, but not an excessive amount of penetration which would be wasteful. The degree of penetration of the chemical mixture into the fibrous layer(s) can be controlled by varying the type, size, quantity and distribution of the fibers in the layer(s), and the nature of the binder in the layer(s), as well as the chemical composition and viscosity of the froth and the processing temperatures.

Advantageously, fibrous material 31 comprises a mat of non-woven fibers, which can be produced by a number of conventional wet or dry processes. The mat can consist of a mixture of organic and/or inorganic fibers of different types and sizes (e.g., a 100% organic mat). The fibers of the mat are bonded together with a binder, such as an acrylic, epoxy, polyester, urea formaldehyde, SBR, ethylene-vinyl chloride, polyvinyl acetate, phenolic or melamine binder. The fiber binder is present in a sufficient amount, such as 10 to 30% by weight of the finished mat. The mat has a weight from about 0.5 to 3 pounds per hundred square feet. The thickness of the mat can vary between about 5 to 15 mils, preferably 7 to 12 mils. Its width can range between about 48 and 60 inches, preferably 54 and 58 inches. A highly suitable mat for the process of the invention is a combination of polyester and cellulose fibers produced by a conventional wet-laid, non-woven process, wherein the liquid treatment of the fibers results in a random pattern. An SBR binder is preferred. However, an acrylic or other suitable binder can be used.

Upper mat 31' also desirably comprises a mat of non-woven fibers, and advantageously is similar in most respects to the lower mat. However, it can be more porous than the lower mat. A particularly satisfactory upper mat is a mat of chopped glass fibers with an acrylic binder.

In another preferred embodiment, the upper and lower mats are strippable/removable facers (e.g., kraft paper).

By virtue of rotation of the pull rolls 36 and 37, the lower fibrous material is pulled from the roll 30, whereas the upper fibrous material is pulled from the roll 30'. The fibrous material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper fibrous material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous modifications can be made to the above-described apparatus. For example, endless conveyors can be positioned in oven 34 to provide a restrained rise production of the foam laminate, as described in U.S. Pat. No. 4,572,865. Also, the tanks 10, 11 and 12 can be provided with refrigeration means in order to maintain the reactants at subambient temperatures. In another modification, the frothing agent is not delivered into lines 13 or 14, but is admixed with the foam-forming ingredient(s) in tanks 10 and/or 11. This approach is especially advantageous for handling large amounts of the highly volatile frothing agent, which can, for example, be apportioned in tanks 10 and 11 which are specially adapted (e.g., pressurized) to hold the frothing agent-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a sufficiently low frothing agent level so that the foam-forming mixture has the consistency of the liquid foamable mixture of this example, the glass mat becomes distributed within the foam core. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form an expanded reinforcement material in the resulting structural laminate.

When the level of frothing agent in the blowing agent composition is increased to the point where the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interior to the lower or upper facing sheet or to both, as described in U.S. Pat. No. 4,572,865.

An additional material(s) may be laminated to foam board panel 46. Such additional laminating materials may or may not add reinforcement to the board panels. For example, a decorative covering may be added to one or both of the panel's major faces to provide a good surface appearance for ornamental purposes before the composite is molded into a desired shape. In a vehicle trim panel, this decorative covering material may be fabric or some other material as may be aesthetically pleasing to an occupant of a motor vehicle. This decorative covering may be applied to the laminate prior to, during or after molding, such as during formation of the laminate. When removable facings are utilized during the foaming step, they are removed and all final coverings, including any decorative facer, may be applied before, during or after thermoforming.

Figure 2:
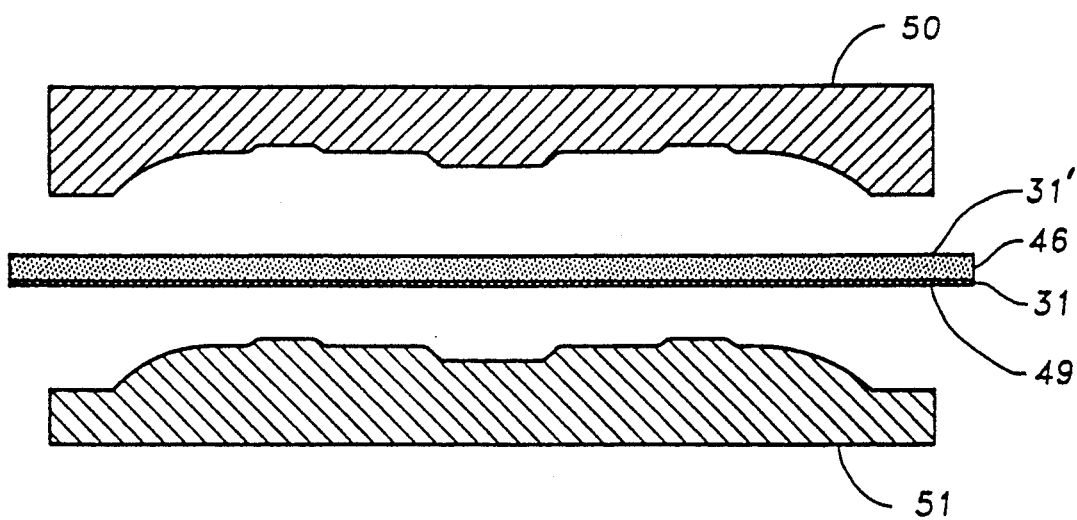
FIG. 2 is a side schematic representation of a foam laminate about to be thermoformed in a mold.

A decorative fabric layer may be bonded to the foam laminate in a conventional manner, for example, by using an adhesive conventionally used for this purpose such as an acrylic adhesive or by melt bonding. In an advantageous embodiment of the invention, decorative covering material 49 is secured or laminated to fibrous facing 31 of foam laminate 46, whose other major surface is covered by fibrous facing 31', as shown in FIG. 2.

Figure 3:
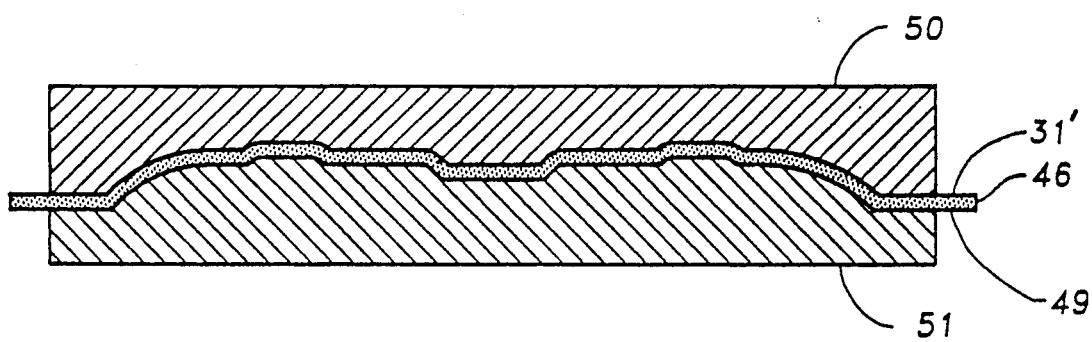
FIG. 3 is a side schematic representation of a foam laminate being shaped by the mold which is in the closed position.
Figure 4:
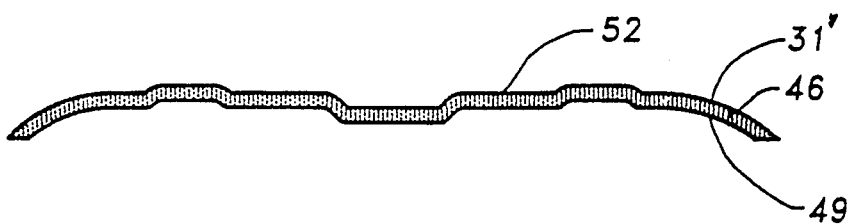
FIG. 4 is a cross-sectional side view of a thermoformed foam laminate.

The decoratively faced laminate may be thermoformed to the desired shape, e.g., an automobile headliner, using a conventional technique. For example, in the thermoforming operation, the laminate is heated to temperatures in the range of 150° to 210° C., preferably 199° to 207° C., for a period of time (e.g., 0.5 to 10 minutes) sufficient to render the laminate pliable. As shown in FIGS. 2-4, the laminate is then placed between the top portion 50 of the mold and its bottom portion 51. Decorative layer material 49 and facing material 31' are shown on either side of foam board panel 46 prior to the molding process. The mold may be cooled, kept at ambient temperature or preheated. FIG. 3 shows the foam board panel secured between the top and bottom portions of the mold with the mold in the closed position. FIG. 4 shows contoured part 52 molded to the desired end configuration.

The invention is further illustrated by the following examples in which all parts and percentages are by weight unless otherwise indicated.

EXAMPLE 1

This example illustrates the process of the present invention for producing thermoformed foam laminates by reference to FIGS. 1-4 of the drawings.

The following isocyanurate formulation was used in preparing the foam cores of the laminates of the following Table I.

| Item | Ingredient | Parts by Weight |
|------|------------|-----------------|
| A | Isocyanate[1] | (See below)[5] |
| B | $CCl_3F$ | 42 |
| C | $CCl_2F_2$ | 10 |
| D | Silicone surfactant[2] | 2 |
| E | Polyester polyol[3] | (See below)[5] |
| F | Catalyst[4] | 5 |

[1]Item A is a polymethylene polyphenyl isocyanate having an equivalent weight of 138, an acidity of 0.02% HCl, and a viscosity of 2,000 centipoises at 25° C., and is available from the Mobay Chemical Company under the trade name MONDUR MR-200.
[2]Item D is that supplied by the Union Carbide Corporation under the trade name Y-10222.
[3]Item E is a reaction product of phthalic anhydride and diethylene glycol (DEG) having a hydroxyl number of 230-250, a viscosity at 25° C. of 2000-3500 cps, and an acid number of 2.0-3.0, and is supplied by Stepan Company under the trade name Stepanpol PS2502A.
[4]Item F is a mixture employed in the form of a solution in DEG in a weight ratio of 1.18 potassium acetate:2.31 potassium octoate:0.69 DMP-30:5.82 DEG.
[5]Amounts required to produce foams having % trimer shown in the Table.

Referring now to FIG. 1, tank 10 was charged with a mixture of items A, B and D, tank 11 was charged with item E, and tank 12 was charged with item F. The Table below shows for the production of each of laminates A to J the top and bottom facers 31' and 31. The facers were fed toward the nip of metering rolls 32 and 33, and the pumps 16, 17 and 18 were started to discharge the contents of the tanks 10, 11 and 12 into the respective feed lines to carry the ingredients to the mixing head 29. Item C was injected into the isocyanate-containing component at the opening formed into conduit 13. The mixing head 29 deposited the foam forming mixture onto the lower facer and both upper and lower facers and foamable mixture were then conveyed into the oven 34 to produce foam laminates 46,46'. Various properties of the resulting thermoformable foam laminates are reported in Table I below.

The foam laminate was next heated at 400° F. (204.4° C.) for 2-5 in a hot air convection oven (not shown). The laminate was then placed between the preheated molding members 50 and 51 shown in FIGS. 2 and 3, but without decorative layer 49 shown in the drawings. The mold members were held at 32°-38° C., and pressed together for 2-2.5 min to form the desired shaped part. After the thermoforming, a decorative layer(s) may be applied to the contoured article. The molded foam laminate of the invention may be used in a wide variety of applications, such as those mentioned in U.S. Pat. No. 4,129,697, and is particularly suitable as a foam automotive headliner.

TABLE I

THERMOFORMABLE FOAM LAMINATES
Physical Properties

| LAMINATE | A | B | C | D | E | F | G | H | I | J |
|----------|---|---|---|---|---|---|---|---|---|---|
| % Nominal Trimer[1] | 10 | 10 | 10 | 10 | 12 | 12 | 12 | 12 | 12 | 14 |
| Facers[2] | | | | | | | | | | |
| Top | MW-5160 | MW-5160 | RV 2.2 | RV 2.2 | RV 2.2 | RV 2.2 | MW-5160 | MW-5160 | RV 2.2 | MW-5160 |
| Bottom | MW-5160 | MW-5160 | RV 2.2 | RV 2.2 | MW-5160 | MW-5160 | MW-5160 | MW-5160 | MW-5160 | MW-5160 |
| Thickness, mm | 18 | 12 | 19 | 12 | 15 | 10 | 12 | 15 | 16 | 15 |
| Density | | | | | | | | | | |
| core[3], pcf | 1.7 | 1.7 | 2.2 | 2.5 | 2.2 | 2.4 | 1.95 | 1.9 | 1.9 | 1.8 |
| product, pcf | 2.0 | 2.1 | 2.7 | 3.2 | 2.7 | 2.9 | 2.5 | 2.4 | 2.5 | 2.3 |
| Closed Cells, %, core[3] | 14 | 76 | 87 | 87 | 84 | 88 | 83 | 83 | 84 | 86 |
| Flexural Strength, psi MD/TD | 78/47 | 89/51 | 178/190 | 333/296 | 127/93 | 123/108 | 114/109 | 92/87 | 184/169 | 92/90 |
| Compressive Strength, psi | 16 | 15 | 29 | 30 | — | — | — | — | 20.3 | — |
| Water Absorption, % by volume | 4.2 | 2.7 | 4.2 | 5.1 | 1.5 | 1.4 | 1.8 | 1.6 | — | 1.4 |
| Dimensional Stability, % change (MD + TD/2, 14 days, 5" × 5") | | | | | | | | | | |
| 70° C./95% RH | −0.26 | 0.08 | 0.86 | 0.34 | 0.35 | 0.63 | 0.27 | 0.20 | 0.30 | 0.53 |
| 125° C. | −0.56 | −0.11 | 0.42 | 0.14 | — | — | — | — | — | — |
| 93° C. | −0.18 | 0.0001 | 0.91 | 0.37 | 0.37 | 0.54 | 0.22 | 0.47 | 0.45 | 0.68 |
| −40° C. | −0.04 | −0.02 | −0.03 | −0.09 | 0.08 | 0.05 | <0.001 | 0.06 | −0.05 | 0.04 |

NOTES:

[1]% Nominal Trimer = $\dfrac{\text{(No. of equivalents of isocyanate − No. of equivalents of polyol)}}{\text{(Wt. of isocyanate + Wt. of polyol)}} \times 4200$ In the calculation of the % Nominal Trimer, only the polyester polyol's hydroxyl groups are considered.
[2]MW-5160 = mat of polyester and cellulose fibers with a density of 1.0 lb/100 ft² supplied by Lydall Manning Corporation of Try, NY under the trade name Manniweb 5160. RV 2.2 = mat of glass fibers with a density of 2.2 lbs/100 ft² supplied by The Celotex Corporation, Tampa, Florida.
[3]With the exception of core densities and % closed cells listed above, all other properties listed in the table relate to the laminated product.

EXAMPLE 2

This example illustrates the process of the invention for producing open celled, thermoformed foam laminates utilizing the blowing agents $CHClF_2$ (HCFC-22) and water by reference to the drawings.

A structural laminate was first prepared from the ingredients and quantities thereof shown in Table II below. Tank 10 was charged with a mixture of the polyisocyanate, HCFC-22 and surfactant, tank 11 was charged with a mixture of the polyester polyol, HCFC-22 and water, and tank 12 was charged with the catalyst. The top and bottom facers were each 40# kraft paper.

The facers were fed toward the nip of metering rolls 32 and 33, and the pumps 16, 17 and 18 were started to discharge the contents of the tanks 10, 11 and 12 into the respective feed lines to carry the ingredients to the mixing head 29. The mixing head 29 deposited the foam forming mixture onto the lower facer and the sandwich of upper and lower facers and foamable mixture was then conveyed into the oven 34 to produce foam laminates 46,46'. Table II below shows various properties of the resulting thermoformable foam laminates.

The paper facers were removed from the laminates and replaced by suitable headliner facers to produce composite articles of the invention. The thermoforming was accomplished as described in Example 1.

TABLE II

| PRODUCTION OF STRUCTURAL LAMINATES | |
|---|---|
| % Nominal Trimer (index) | 13.2 (3.09) |
| % Actual Trimer (index) | 9.8 (2.09) |
| INGREDIENTS, pts by wt | |
| A-Component | |
| Isocyanate[1] | 192.0 |
| $CHClF_2$ | 24.5 |
| Surfactant[2] | 2.0 |
| B-Component | |
| Polyester polyol[3] | 108.0 |
| $CHClF_2$ | 14.0 |
| Water | 0.75 |
| C-Component | |
| Catalyst[4] | 10 |
| FOAM PROPERTIES[5] | |
| Thickness, mm | 25 |
| Density, pcf | 2.1 |
| Closed Cells, % | 35 |
| Flexural Strength, psi MD/TD | 31/26 |
| Compressive Strength, psi | 29 |
| Water Absorption, % by volume | 2.17 |
| Dimensional Stability | |
| % change (MD + TD/2, 7 days, 5" × 5") | |
| 70° C./95% RH | −0.36 |
| 93° C. | −0.29 |
| −40° C. | −0.10 |

NOTES:
[1]Of Example 1.
[2]Of Example 1.
[3]Of Example 1.
[4]Catalyst = mixture employed in the form of a solution in DEG in a weight ratio of 2.36 potassium acetate: 0.62 DMP-30:7.02 DEG.
[5]All properties listed in the Table relate to the core foam.

EXAMPLE 3

This example illustrates the process of the invention for producing open celled, thermoformed foam laminates utilizing the blowing agent $CFCl_2CH_3$ (HCFC-141b).

A Hennecke foam machine was employed to prepare the foam from the ingredients and quantities thereof listed in the following Table III. The "A-Component" ingredients were premixed together, metered and injected into one side of the high pressure impingement mixing chamber. The "B-Component" ingredients were also premixed and metered amounts of this premix and the "C-Component" were injected into the other side of the mixing chamber. After mixing, all ingredients were dispensed into a box, yielding a polyisocyanurate foam having the characteristics reported below in Table III.

The foam was cut into 2 ft.×4 ft. slabs having thicknesses of 7 mm and 11.5 mm for the thermoforming operation. Suitable headliner facers were applied in the production of the polyisocyanurate shaped objects of the invention. The thermoforming was performed in accordance with the procedure described in Example 1.

TABLE III

| PRODUCTION OF FOAM SLABS | |
|---|---|
| % Nominal Trimer (index) | 10.0 (2.27) |
| % Actual Trimer (index) | 7.5 (1.83) |
| INGREDIENTS, pts by wt | |
| A-Component | |
| Isocyanate[1] | 170 |
| $CFCl_2CH_3$ | 25 |
| Surfactant[2] | 2.0 |
| B-Component | |
| Polyester polyol[3] | 130 |
| $CFCl_2CH_3$ | 14 |
| C-Component | |
| Catalyst[4] | 10 |
| FOAM PROPERTIES | |
| Thickness, mm | 25 |
| Density, pcf | 2.0 |
| Closed Cells, % | 28 |
| Flexural Strength, psi MD/TD | 33/32 |
| Compressive Strength, psi | 23 |
| Water Absorption, % by volume | 2.83 |
| Dimensional Stability | |
| % change (MD + TD/2, 7 days, 5" × 5") | |
| 70° C./95% RH | 1.2 |
| 93° C. | 0.38 |
| −40° C. | −0.23 |

NOTES:
[1]Of Example 1.
[2]Surfactant = Silicone type supplied by Pelron Corporation under the trade name PELRON 9737.
[3]Of Example 1.
[4]Of Example 2.

We claim:

1. A molded polyisocyanurate foam prepared by thermoforming the reaction product made under foam-forming conditions of an organic polyisocyanate and a polyol component selected from the group consisting of (i) a polyester polyol and (ii) a polyester polyol and at least one other OH-containing compound, the equivalent ratio of isocyanate groups to hydroxyl groups being at least 1.5 to 1, and the reaction under foam-forming conditions being conducted in the presence of a trimerization catalyst.

2. The molded polyisocyanurate foam of claim 1 wherein the foam contains at least 50% open cells.

3. The molded polyisocyanurate foam of claim 2 wherein the foam has one or more facing layers bonded to at least one of the foam surfaces to form a unitary article.

4. The molded polyisocyanurate foam of claim 3 wherein the foam comprises the reaction product of an organic polyisocyanate containing at least 50 weight percent of polymeric MDI and an aromatic polyester polyol in the presence of a blowing agent and catalyst, the equivalent ratio of isocyanate groups to hydroxyl groups being at least 1.6 to 1.

5. A molded polyisocyanurate foam prepared by thermoforming the reaction product made under foam-forming conditions in the presence of a trimerization catalyst of an organic polyisocyanate containing at least 50 weight percent of polymeric MDI and a polyol comprising a polyester polyol and optionally at least one member selected from the group consisting of polyether polyols, polyesterether polyols and mixtures thereof, the equivalent ratio of isocyanate groups to hydroxyl groups being at least 1.5 to 1.

6. The molded polyisocyanurate foam of claim 1 wherein the reaction under foam-forming conditions is conducted in the presence of at least one additive selected from the group consisting of processing aids, viscosity reducers, flame retardants, dispersing agents, reinforcing agents, plasticizers, mold release agents, stabilizers against aging and weathering, compatibility agents, fungistatic and bacteriostatic substances, dyes, fillers and pigments.

7. The molded polyisocyanurate foam of claim 1 wherein the blowing agent for the foam-forming reaction is selected from the group consisting of water, air, nitrogen, carbon dioxide, readily volatile organic substances, compounds which decompose to liberate gases and mixtures thereof.

8. The molded polyisocyanurate foam of claim 1 wherein the foam has one or more facing layers bonded to at least one of the foam surfaces to form a unitary article.

9. The molded polyisocyanurate foam of claim 1 wherein the polyol component is an aromatic polyester polyol.

10. The molded polysiocyanurate foam of claim 9 wherein the organic polyisocyanate comprises at least 50 percent of polymeric MDI.

11. The molded polyisocyanurate foam of claim 9 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

12. The molded polyisocyanurate foam of claim 9 wherein the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

13. The molded polyisocyanurate foam of claim 12 wherein the polycarboxylic acid component is selected from the group consisting of phthalic anhydride, phthalic acid, and mixtures thereof.

14. The molded polyisocyanurate foam of claim 13 wherein the organic polyisocyanate comprises at least 50 weight percent of polymeric MDI.

15. The molded polyisocynaurate foam of claim 3 wherein the polyol component is an aromatic polyester polyol.

16. The molded polyisocyanurate foam of claim 15 wherein the organic polyisocyanate comprises at least 50 weight percent of polymeric MDI.

17. The molded polyisocyanurate foam of claim 16 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

18. The molded polyisocyanurate foam of claim 16 wherein the reaction under the foam-forming conditions is conducted in the presence of at least one additive selected from the group consisting of processing aids, viscosity reducers, flame retardants, dispersing agents, reinforcing agents, plasticizers, mold release agents, stabilizers against aging and weathering, compatibility agents, fungistatic and bacteriostatic substances, dyes, fillers and pigments.

19. The molded polyisocyanurate foam of claim 16 wherein the blowing agent for the foam-forming reaction is selected from the group consisting of water, air, nitrogen, carbon dioxide, readily volatile organic substances, compounds which decompose to liberate gases and mixtures thereof.

20. The molded polyisocyanurate foam of claim 16 wherein the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

21. The molded polyisocyanurate foam of claim 20 wherein the polycarboxylic acid component is selected from the group consisting of phthalic anhydride, phthalic acid, and mixtures thereof.

22. The molded polysiocyanurate foam of claim 3 wherein the polyol component is an aromatic polyester polyol and the foam contains at least about 70% open cells.

23. The molded polyisocyanurate foam of claim 22 wherein the organic polyisocyanate comprises at least 50 weight percent of polymeric MDI.

24. The molded polyisocyanurate foam of claim 23 wherein the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

25. The molded polyisocyanurate foam of claim 24 wherein the polycarboxylic acid component is selected from the group consisting of phthalic anhydride, phthalic acid, and mixtures thereof.

26. The molded polyisocyanurate foam of claim 5 wherein the foam contains at least 50% open cells.

27. The molded polyisocyanurate foam of claim 5 wherein the polyester polyol is an aromatic polyester polyol.

28. The molded polyisocyanurate foam of claim 27 wherein the foam has one or more facing layers bonded to at least one of the foam surfaces to form a unitary article.

29. The molded polyisocyanurate foam of claim 28 wherein the aromatic polyester polyol is the reaction product of a polycarboxylic acid component selected from the group consisting of phthalic anhydride, phthalic acid, and mixtures thereof and an aliphatic diol of the formula:

$$HO-R-OH$$

wherein R is a divalent radical selected from the group consisting of:
(a) alkylene radicals each containing from 2 through 6 carbon atoms, and
(b) radicals of the formula: $-(R^1O)_m-R^1-$ wherein $R^1$ is an alkylene radical containing from 2 through 6 carbon atoms, and m is an integer of from 1 through 4, and
(c) mixtures thereof.

* * * * *